United States Patent [19]
Decker

[11] 3,924,584
[45] Dec. 9, 1975

[54] INTERNAL COMBUSTION ENGINE OPERATED BY A LAYERED CHARGE

[75] Inventor: Gerd Decker, Wolfsburg, Germany

[73] Assignee: Volkswagenwerk Aktiengesellschaft, Wolfsburg, Germany

[22] Filed: Mar. 6, 1974

[21] Appl. No.: 448,499

[30] Foreign Application Priority Data
Mar. 12, 1973 Germany............................ 2313201

[52] U.S. Cl.......... 123/32 ST; 123/30 C; 123/30 D; 123/32 K; 123/32 SP; 123/191 SP
[51] Int. Cl.².......................................... F02B 3/00
[58] Field of Search........... 123/32 SP, 32 ST, 32 K, 123/32 C, 30 C, 30 D, 191 S, 191 SP, 188 S, 188 AF, 188 M

[56] References Cited
UNITED STATES PATENTS

| | | | |
|---|---|---|---|
| 2,534,346 | 12/1950 | Fenney............................ | 123/32 ST |
| 2,595,914 | 5/1952 | Barber............................. | 123/30 C |
| 3,294,072 | 12/1966 | Simko............................. | 123/191 SP |
| 3,418,981 | 12/1968 | Von Seggern.................... | 123/30 C |
| 3,443,552 | 5/1969 | Von Seggern.................... | 123/32 ST |
| 3,508,530 | 4/1970 | Clawson.......................... | 123/32 ST |
| 3,703,886 | 11/1972 | Witzky............................. | 123/32 ST |
| 3,799,140 | 3/1974 | Vogelsang....................... | 123/191 S |

FOREIGN PATENTS OR APPLICATIONS

| | | | |
|---|---|---|---|
| 100,109 | 1/1937 | Australia.......................... | 123/32.9 |
| 443,348 | 2/1936 | United Kingdom........... | 123/191 SP |
| 1,051,186 | 9/1953 | France............................. | 123/32 SP |
| 177,704 | 12/1954 | Sweden........................... | 123/32 SP |

Primary Examiner—Charles J. Myhre
Assistant Examiner—Daniel J. O'Connor
Attorney, Agent, or Firm—Ernest F. Marmorek

[57] ABSTRACT

An internal combustion engine of the type operated by a stratified charge. Such an engine has a main combustion chamber and a precombustion chamber or anti-chamber connected with the main combustion chamber by a connecting channel. Means are provided for generating a twisting current in the main combustion chamber. Additionally, the connecting channel between the two chambers issues into the main combustion chamber in the direction of the twisting or rotating current. Preferably, the connecting channel extends in a tangential direction into the main combustion chamber.

7 Claims, 3 Drawing Figures

INTERNAL COMBUSTION ENGINE OPERATED BY A LAYERED CHARGE

BACKGROUND OF THE INVENTION

This invention relates generally to an internal combustion engine operated with a stratified or layered charge and particularly to such an engine having a main combustion chamber and an anti-chamber or precombustion chamber connected with the main combustion chamber by a connecting channel.

Internal combustion engines which are externally ignited and which are operated with a layered charge have been known for many years in many modification. The basic concept for all such stratified charge processes consists in a construction design which permits a differential composition of the cylinder charge at the instant ignition in such a manner that in the neighborhood of the spark plug, there is provided a mixture rich in fuel and capable of being ignited. On the other hand, the charge in the remainder of the combustion space is made in accordance with the most favorable operating conditions of the motor and consists of a lean mixture or even of pure air.

Attempts have been made to provide with a stratified charge a safe ignition of the cylinder charge within wide limits of the composition of the mixture. Furthermore, it has been attempted to operate Otto engines with a higher compression ratio without reaching the limit of knocking. Today, however, the layered charge process is viewed as a possible way of reducing the damaging or noxious materials contained in the exhaust gases of internal combustion engines and particularly of the nitrous oxides.

It is known that the formation of nitrous oxide in the presence of fresh oxygen only takes place to an appreciable extent at temperatures above 1800°C (centigrade). Furthermore, it is known that the combustion temperatures change widely in accordance with the composition of the mixture of the cylinder charge. The highest combustion temperatures occur at approximately stoichiometric mixture compositions and the highest concentrations of nitrous oxides occur at a surplus of about 10 percent air. Only for an appreciably large excess of air are all three noxious materials, that is nitrous oxides, hydrocarbons and carbon monoxide, drastically reduced provided that a stable combustion is possible. From this knowledge, it can be concluded that it is possible to obtain an ideal process for the combustion in an engine from the point of view of the emission of noxious materials. This process, however, can only be realized by an effective control of the combustion process in a correspondingly shaped combustion space.

For the known combustion engines operated with a layered charge, the combustion chamber is subdivided into a main combustion chamber limited by the piston and an anti-chamber connected with the main combustion chamber. The anti-chamber is provided with an ignition device, for example, in the form of a spark plug and a fuel feed device, for example, a fuel injection nozzle, or a special additional inlet valve for feeding in the fuel-rich mixture. The anti-chamber is connected with the main combustion chamber by a connecting channel. Accordingly, after ignition of the fuel-rich charge present in the anti-chamber, the flame front can move in order to burn the remaining cylinder charge which is poor in fuel depending on the load in the main combustion chamber. For this known internal combustion engine operated with a layered charge, there is approximated an ideal combustion process from the point of view of the noxious materials. Accordingly, the combustion is retarded or delayed in that initially a first portion of the charge is burned in the anti-chamber with the fuel-rich mixture and only thereafter the remaining cylinder charge is burned in the main combustion chamber. By means of this delayed combustion process the combustion peak temperatures and the peak pressures occurring during the combustion are reduced.

It is accordingly an object of the present invention to improve an internal combustion engine operated with a layered charge of the type previously described so that the combustion conditions further approach the ideal combustion process from the point of view of the emission of noxious materials.

A further object of the invention is to provide an internal combustion engine of the type referred to having an appreciably reduced emission of noxious materials.

SUMMARY OF THE INVENTION

These objects are obtained in accordance with the present invention in that means are provided for generating a twisting or rotating current in the main combustion chamber. Furthermore, the connecting channel between the main combustion chamber and the anti-chamber issues in the main combustion chamber in the direction of this twisting current. It is already known that internal combustion engines operated with a layered charge generate in the combustion chamber a twisting current. However, this twisting current was used essentially for obtaining the layers of the charge in an undivided combustion chamber. In accordance with the present invention, the twisting current in the main combustion chamber must be viewed in connection with the connecting channel issuing into the main combustion chamber in the direction of the twisting current. By this arrangement it is achieved that the combustion gases which issue after the ignition in the anti-chamber from the anti-chamber through the connecting channel into the main combustion chamber, move in the same direction as the twisting current in the main combustion chamber. In this manner, the combustion is so retarded that peak temperatures are avoided while on the other hand, increased intermediate temperatures are maintained over a longer period of time. In this manner there is achieved a reduction of the energy turnover velocity and the resultant reduction of the energy of the pressure increase and of the peak temperatures in the combustion chamber. This in turn results in a combustion process which widely approximates the ideal combustion process from the point of view of the emission of noxious materials.

Preferably, the connecting channel issued in the main combustion chamber essentially in a tangential direction. The means for generating the twisting current in the main combustion chamber are formed by making the inlet valves in the form of umbrella valves. The twisting current in the main combustion chamber, however, may also be obtained by a twist-generating shape of the inlet channel or by a twisting current generating contour of the cover of the piston moving in the cylinder.

According to a further feature of the invention the connecting channel issues essentially in a tangential direction into the anti-chamber which preferably has the shape of a sphere and is provided with a fuel feed device and an ignition device. By means of this tangential direction of the connecting channel into the anti-chamber, a twisting current is also generated and supports the processing of the fuel fed thereto. However, besides a spherical-like shape of the anti-chamber, other shapes are possible such, for example, as disk-like or cylinder-like anti-chambers.

Finally, it is proposed that the main combustion chamber has the form of a right circular cylinder cut off at an inclined plane and that the connecting channel is disposed aligned with the ceiling of the main combustion chamber which extends at an incline with respect to the normal of the cylinder axis.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

Figure 1:
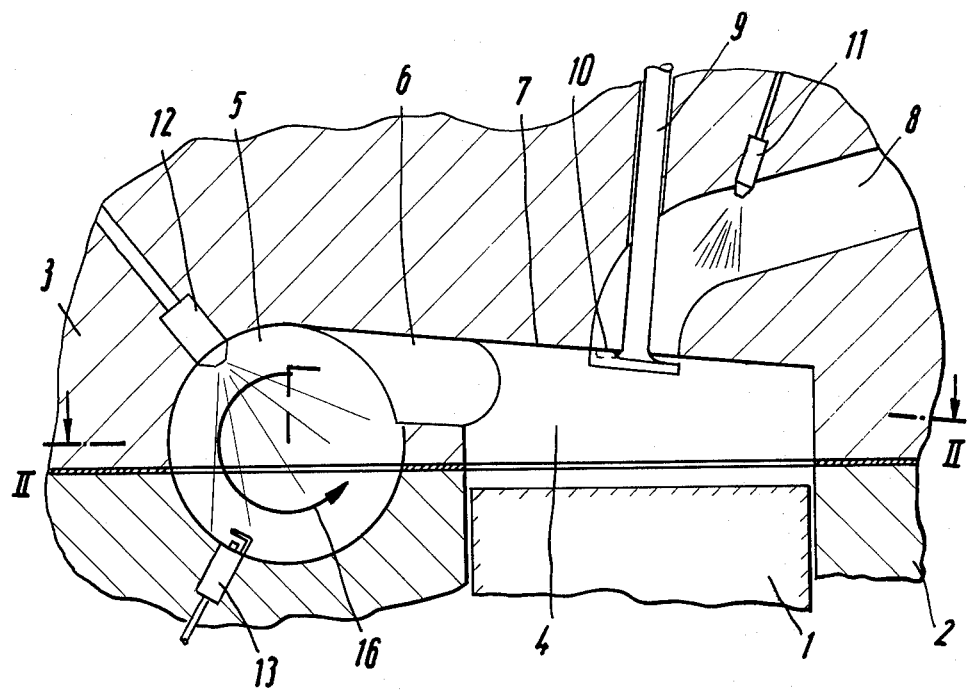
FIG. 1 is a longitudinal section along section line I—I of FIG. 2 through the cylinder head of an internal combustion engine provided with a main combustion chamber and an anti-chamber.

DESCRIPTION OF THE PREFERRED EMBODIMENT.

Referring now to the drawing, the internal combustion engine includes a piston 1 slidably disposed in a cylinder housing 2. The combustion chamber disposed in a cylinder head 3 is divided in a main combustion chamber 4 disposed immediately above the piston 1 and an anti-chamber 5 disposed laterally adjacent the main combustion chamber 4. The anti-chamber 5 is connected by means of a connecting channel 6 with the main combustion chamber 4. The anti-chamber 5 in the example of the invention illustrated in the drawing is of approximately spherical shape and included 20 – 30 percent of the volume of the entire combustion space above the upper dead center of the piston 1. The connecting channel 6 has a relatively large diameter D compared to its length L (L/D ≤ 1). The main combustion chamber 4 has the shape of a right circular cylinder having an inclined top. The connecting channel 6 is so arranged with respect to the ceiling 7 which extends at an angle to the normal of the cylinder axis of the main combustion chamber 4 so that the connecting channel issues essentially in a tangential direction in the anti-chamber 5.

A fresh air inlet channel 8 may be closed by an inlet valve 9 which may have the shape of an valve with a deflector or collar 10. An injection nozzle 11 is disposed in the inlet channel 8 for feeding in the fuel. A second injection nozzle 12 is disposed in the anti-chamber 5 ahead of an ignition device which may consist of a spark plug 13 as viewed in the direction of the current flow. Finally, arrows 15 show the direction of rotation of the movement of the charge in the main combustion chamber 4 while the arrow 16 shows the movement of the charge in the anti-chamber 5 during the compression cycle; finally the arrow 17 designated the direction of the gases to be burned which flow after ignition from the anti-chamber 5 into the main combustion chamber 4. Now, through the arrangement of the collar 10 at the valve plate of the inlet valve 9 the fuel gas mixture flowing in is forced into a twisting movement in the direction of the arrows 15. This twisting current in the main combustion chamber 4 remains during the compression cycle during which a portion of the cylinder charge is pushed through the connecting channel 6 into the anti-chamber 5. In view of the fact that the connecting channel 6 issues in a tangential direction into the spher-like anti-chamber 5, in the anti-chamber 5 there is generated a twisting current in the direction of arrow 16. This twisting current contributes to the processing of the fuel-air mixture which has been enriched by a further fuel injection by means of the injection nozzle 12 extending into the anti-chamber. The spark plug 13 which ignites this enriched mixture is disposed behind the injection nozzle 12 as viewed in the direction of the current flow. Preferably, the spark plug 13 is disposed in the region of the wall of the anti-chamber which is touched by the gas stream deformed by the cone of the injected fuel.

After ignition the portion of the charge contained in the anti-chamber is initially burned with a relatively fuel-rich mixture substantially without a sufficient amount of air. In this manner, a combustion front is originated which flows through the connecting channel 6 into the main combustion chamber 4. This combustion front moves because the connecting channel 6 issues in an essentially tangential direction in the direction of the movement of the charge in the main combustion space and in the same direction as the charge in the main combustion chamber. This prevents a shock-like combustion in the main combustion chamber 4 and hence retards the combustion so that extremely high peak temperatures are avoided which cause the formation of nitrous oxides; instead an increased intermediate temperature is maintained over a prolonged period of time.

The essential features of the invention consist in that means are provided for generating a twist or rotation in the main combustion chamber 4 and that the connecting channel 6 between the main combustion chamber 4 and the anti-chamber 5 issues into the main combustion chamber in such a manner that the gases to be burned which flow through the connecting channel into the main combustion space move in the same direction as the charge in the main combustion space. The means for generating the twisting motion are provided in the embodiment illustrated in the drawing by an inlet valve which is arranged in a known manner as an umbrella valve. It is, however, possible to obtain the twisting current in the main combustion chamber by a suitable shaping and suitable guidance of the inlet channel 8 or by other means already known such, for example, as suitable shaping of the front wall of the piston 1.

It will be understood that the fuel feed of the internal combustion engine of the invention may take place in some other manner than by means of the fuel injection devices 11 and 12 shown in the drawing. By way of example, the fuel injection nozzle 11 in the inlet channel 8 may be replaced by a known carburetor which, dependent upon the demand on the internal combustion engine, will develop a more or less lean mixture. Instead of the fuel nozzle 12, it is also feasible to provide in a known manner in the anti-chamber 5 an additional inlet valve for feeding a fuel-air mixture produced by a special carburetor.

Figure 2:
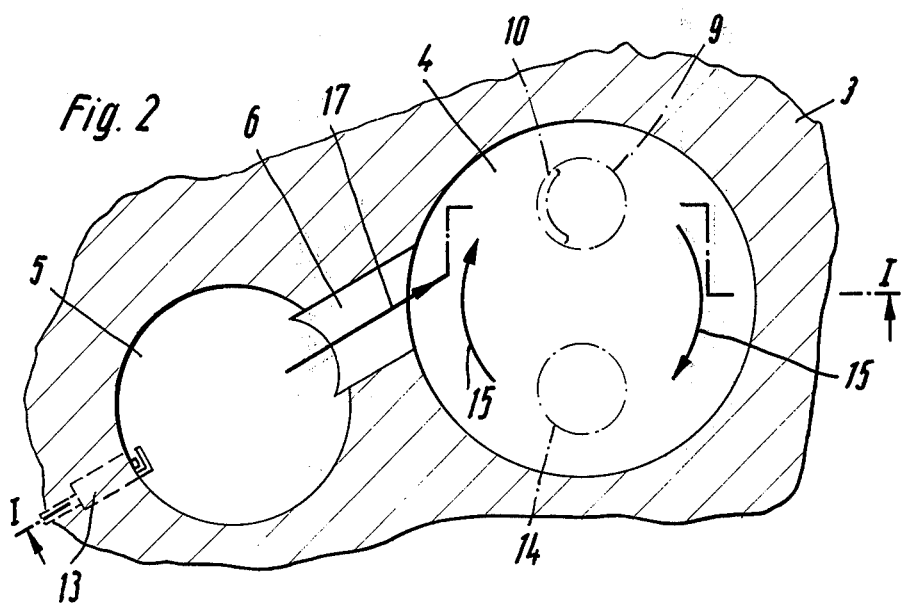
FIG. 2 is a cross-section taken on line II—II of FIG. 1 through the cylinder head.

Furthermore, the illustrated embodiment of inlet and outlet valves with respect to the gases to be burned which move from the anti-chamber into the main combustion chamber are are only one possible embodiment. In certain cases, it may even be more advantageous for the burning process in the main combustion chamber to arrange the valves in the main combustion chamber in such a manner that the combustion front which moves from the connecting channel into the main combustion space is essentially directed to the outlet valve. Thus, for the arrangement shown in FIG. 2, the hot outlet valve may under certain circumstances be the origin for unwanted spontaneous incandescent ignition during the combustion of the main combustion charge in the region of the inlet valve. Thus, the previously mentioned mirror image arrangement would avoid such occurrences, so that the combustion in the main combustion chamber begins immediately within the region of the outlet valve. In other words, in some cases it may be desired to exchange the positions of valves 9 and 14 as shown in FIG. 2.

Figure 3:
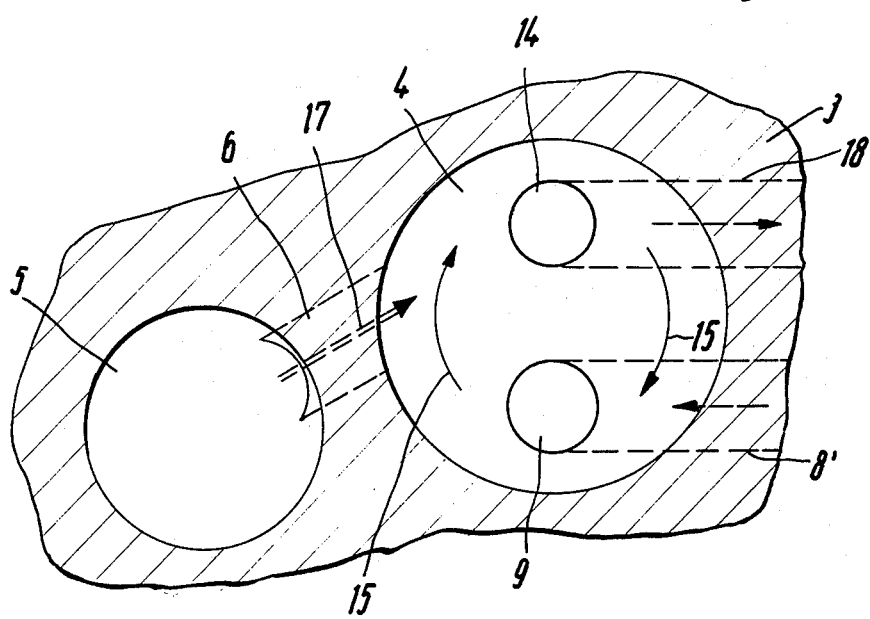
FIG. 3 is a cross-sectional view similar to that of FIG. 2 of a modification of an internal combustion engine in accordance with the invention, but viewed from the piston.

Such an arrangement has been illustrated in FIG. 3 wherein the same elements are designated by the same reference numbers. In this embodiment the rotation of the gas in the direction of the arrows 15 in the main combustion chamber is achieved in that the air inlet channel 8 controlled by the inlet valve 9 issues essentially in a tangential direction in the main combustion chamber 4. Also, the exit channel 18 moves approximately in a tangential direction to the main combustion chamber 4.

It should be noted that such an arrangement, that is to guide the outlet channel in a manner to generate a twisting current in the main combustion chamber for internal combustion engines operated with a layered charge, is already known, for example, from U.S. Pat. No. 3,443,552 to von Seggern et al. and the British Pat. No. 1,212,546.

It should be noted that in the embodiment of FIG. 3, after the mixture has been ignited in the anti-chamber 5, the combustion front which flows through the connecting channel 6 into the main combustion chamber 4 first meets the hotter exit valve 4 and only afterwards the inlet valve 9.

What is claimed is:
1. Internal combustion engine operated with a stratified charge, comprising:
   a. a main combustion chamber;
   b. a precombustion chamber;
   c. a connecting channel interconnecting the precombustion chamber with the main combustion chamber and disposed approximately tangential thereto;
   d. means operative for generating a twisting current in a predetermined direction in the main combustion chamber, said connecting channel issue discharging into the main combustion chamber approximately tangential to the direction of said twisting current.
2. Engine as defined in claim 1 wherein an inlet valve in the form of valve with a deflector is disposed in said main combustion chamber.
3. Engine as defined in claim 1 wherein an inlet channel is provided issuing into said main combustion chamber, said inlet channel having a shape to generate a twisting current.
4. Engine as defined in claim 1 wherein said connecting channel issues into said precombustion chamber in an essentially tangential direction.
5. Engine as defined in claim 1 wherein said precombustion chamber is of sphere-like shape and is provided with a fuel feed device and an ignition device.
6. Engine as defined in claim 1 wherein said main combustion chamber has the shape of a right circular cylinder having a top portion which is inclined with respect to the normal of the axis thereof.
7. Engine as defined in claim 6 wherein said connecting channel follows essentially the inclination of the ceiling of said main combustion engine, said ceiling extending at an angle to the normal to the axis of said cylinder.

* * * * *